(12) United States Patent
O'Connell (10) Patent No.: US 8,113,479 B1
(45) Date of Patent: Feb. 14, 2012

(54) TELESCOPING STABILIZATION SYSTEM COMPRISING A REINFORCED TELESCOPING MEMBER

(76) Inventor: Timothy E. O'Connell, Chico, CA (US)

( * ) Notice: Subject to any disclaimer, the term of this patent is extended or adjusted under 35 U.S.C. 154(b) by 410 days.

(21) Appl. No.: 12/316,850

(22) Filed: Dec. 16, 2008

(51) Int. Cl.
*A47F 5/00* (2006.01)
(52) U.S. Cl. ........................... 248/351; 248/903
(58) Field of Classification Search .................. 248/351, 248/352, 354.1, 354.5, 354.6, 357, 125.8; 254/9 R; 52/149; 29/592, 434; 156/293
See application file for complete search history.

(56) References Cited

U.S. PATENT DOCUMENTS

| | | | | |
|---|---|---|---|---|
| 5,180,131 | A * | 1/1993 | Few .............................. | 248/352 |
| 5,788,204 | A * | 8/1998 | Goodwin et al. ............. | 248/357 |
| 5,873,552 | A * | 2/1999 | Skarp ............................ | 248/161 |
| 6,158,705 | A * | 12/2000 | Cudmore et al. .......... | 248/354.1 |
| 6,776,383 | B2 * | 8/2004 | Lanka .......................... | 248/352 |
| 7,240,885 | B1 * | 7/2007 | Sullivan ..................... | 248/354.1 |
| 7,669,827 | B2 * | 3/2010 | Urrutia .......................... | 248/544 |
| 2003/0189154 | A1 * | 10/2003 | Lanka .......................... | 248/352 |
| 2009/0283653 | A1 * | 11/2009 | Zhang .......................... | 248/352 |
| 2010/0308196 | A1 * | 12/2010 | Lee .............................. | 248/353 |
| 2011/0114813 | A1 * | 5/2011 | Spearing et al. .......... | 248/354.1 |

* cited by examiner

*Primary Examiner* — Ramon Ramirez
(74) *Attorney, Agent, or Firm* — Audrey A. Millemann; Dennis A. DeBoo; Weintraub Genshlea et al.

(57) ABSTRACT

Telescoping stabilization system comprising a telescoping composite strut body which comprises a lower member pivotally coupled at a lower end to a base, a medial member telescopically received within the lower member, and an upper member telescopically received within the medial member and having an upper end portion releasably coupled to a strut head and having a reinforcement member received within a complementally shaped exterior peripheral recess formed in the upper member adjacent its upper end portion wherein the reinforcement member includes an exterior surface lying substantially flush with an exterior peripheral surface of the upper member for being slideably receivable within the medial member when the telescoping composite strut body is in a collapsed position and wherein the rectangular reinforcement member precludes the strut head from splitting the upper member when the telescoping composite strut body is in an extended position and side loaded.

20 Claims, 8 Drawing Sheets

```
┌─────────────────────────────────────────────────────────────┐
│ A method for making a reinforced telescoping member for a   │
│ multiple member telescoping body of a telescoping           │
│ stabilization system, the steps comprising:                 │
└─────────────────────────────────────────────────────────────┘
                              │
┌─────────────────────────────────────────────────────────────┐
│ Providing a rectangular tubular member having a rectangular │
│ sidewall having an exterior peripheral surface;             │
└─────────────────────────────────────────────────────────────┘
                              │
┌─────────────────────────────────────────────────────────────┐
│ Forming a rectangularly shaped peripheral recess having a   │
│ predetermined depth through the exterior peripheral surface │
│ of the rectangular sidewall adjacent an upper end of the    │
│ rectangular tubular member;                                 │
└─────────────────────────────────────────────────────────────┘
                              │
┌─────────────────────────────────────────────────────────────┐
│ Forming a rectangular reinforcement band to a shape         │
│ complemental to a shape of said exterior peripheral recess; │
└─────────────────────────────────────────────────────────────┘
                              │
┌─────────────────────────────────────────────────────────────┐
│ Positioning the rectangular reinforcement band within the   │
│ rectangularly shaped peripheral recess for providing        │
│ reinforcement to the rectangular sidewall while allowing    │
│ the rectangular reinforcement band having a depth           │
│ substantially no greater than the predetermined depth of    │
│ the rectangularly shaped peripheral recess to slideably     │
│ engage within another rectangular tubular member without    │
│ substantial interference; and                               │
└─────────────────────────────────────────────────────────────┘
                              │
┌─────────────────────────────────────────────────────────────┐
│ Using an adhesive to bond the rectangular reinforcement     │
│ band to the rectangular tubular member prior to the         │
│ positioning step.                                           │
└─────────────────────────────────────────────────────────────┘
```

FIG. 10

TELESCOPING STABILIZATION SYSTEM COMPRISING A REINFORCED TELESCOPING MEMBER

FIELD OF THE INVENTION

This invention relates generally to a telescoping stabilization system and, in particular, to a telescoping stabilization system comprising a reinforced telescoping member for providing stability and support between a bearing surface such as a ground surface and a load such as a vehicle, an aircraft, a machine, or a structure. This invention also relates to a method for making the reinforced telescoping member for the telescoping stabilization system.

BACKGROUND OF THE INVENTION

Over the years, vehicles have undergone major changes in both type and construction. Currently, crashes that use to leave vehicles on their wheels are now resulting in more rollovers that leave vehicles on their sides, roofs, or stacked in precarious positions. Passengers are being subjected to extreme bouncing and impact injuries particularly when not restrained by seat belts. Hence, the need for vehicle stabilization has never been greater.

A variety of vehicle stabilization systems and shoring devices are know in the prior art. For example, U.S. Pat. No. 6,776,383, issued Aug. 17, 2004 to Lanka discloses a vehicle bracing apparatus comprised of a main tube; an extension tube disposed in the main tube; and at least one first set of orifices in the main tube and at least one second set of orifices in the extension tube such that a fastener can retain the extension tube in a position relative to the main tube by a passing through aligned first and second sets of orifices. The vehicle bracing apparatus is further comprised of vehicle anchor or head removably connected to a top end of the extension tube and a footer removably connected to bottom end of the main tube.

In another example, U.S. Pat. No. 7,240,885, issued Jul. 10, 2007 to Sullivan discloses an emergency vehicle support kit comprised of a cylinder and two pistons attached to form a telescoping device. When assembled, the telescoping device attaches at one end to a vehicle support base plate by a swivel support base plate adapter and at another end to one of a plurality of attachments or heads.

In a further example, U.S. Pat. No. 6,158,705, issued Dec. 12, 2000 to Cudmore, et al. discloses a vehicle stabilization and support tool comprised of a cylinder and a movable piston that protrudes axially from the cylinder at a cylinder end. The cylinder end is formed with a pair of inclined circumferential surfaces. A collar extends axially from the cylinder and slideably receives the protruding piston. The collar is formed with a pair of internal annular step surfaces corresponding to the cylinder end surfaces. The collar step surfaces and the cylinder circumferential surfaces are engagable to permit rotation and simultaneous axial movement of the collar with respect to the cylinder. A pin is selectively positionable at one of a plurality of holes along the piston for engagement with the collar to prevent movement of the piston with respect to the collar. A locking system is provided for releasably securing the collar against rotation relative to the cylinder. In use, the piston is extended from the cylinder and the pin is inserted through one of the holes along the piston to define an initial extended position. The collar is then rotated to move axially into engagement with the pin and locked in place with respect to the cylinder to define a final fixed extended position of the tool.

The known prior art stabilization systems are known to be problematic in a number of areas which include being heavy and cumbersome to use; relatively weak thereby becoming disabled by, for example, a single blow; corrosive; and electrically conductive which is a concern with the increasing presence of hybrid gas electric vehicles.

Additionally, the prior art fails to recognize and address the problem of system failure due to side loading conditions of a stabilization system.

Accordingly, there is a need for a stabilization system that overcomes the significant shortcomings of the known prior-art.

BRIEF SUMMARY OF THE INVENTION

Accordingly, and in one aspect, an embodiment of the invention ameliorates or overcomes one or more of the significant shortcomings of the known prior art by providing a telescoping stabilization system which is relatively light in weight, strong, and easy to use thereby eliminating extensive training while allowing rescue crews to stabilize complex problems easily. Additionally, and in one aspect, the telescoping stabilization system is comprised of a telescoping composite strut body which is impervious to moisture thereby precluding the strut body from rusting and to chemicals including battery acids. In another aspect, the telescoping composite strut body does not conduct electricity which is extremely important when working around power lines, machinery, aircraft, collapsed structures, and hybrid gas electric vehicles. Furthermore, and in one aspect, an embodiment of the invention provides a telescoping stabilization system which recognizes and addresses the problem associated with system failure due to side loading of the telescoping stabilization system. Moreover, and in one aspect, an embodiment of the invention provides a telescoping stabilization system which can be employed for vehicle, machinery, aircraft, and light structural rescue or salvage.

More particularly, and in one aspect, an embodiment of the invention provides a telescoping stabilization system, the system comprising: a first tubular member having an exterior peripheral surface and a substantially rectangular cross section; a second tubular member having a substantially rectangular cross section wherein the first tubular member is slideably engaged within the second tubular member; a rectangular reinforcement band received within a complementally shaped exterior peripheral recess formed in an upper end portion of the first tubular member for reinforcing the first tubular member; and the rectangular reinforcement band having an exterior surface lying substantially flush with the exterior peripheral surface of the first tubular member for being slideably receivable within the second tubular member without substantial interference therebetween.

In another aspect, an embodiment the present invention provides a telescoping stabilization system, the system comprising: a base; a telescoping composite strut body comprised of a lower strut member having a lower end pivotally coupled to the base, a medial strut member telescopically received within the lower strut member, and an upper strut member telescopically received within the medial strut member so that the telescoping composite strut body is telescopically adjustable between an extended position and a collapsed position; a strut head having a shaft releasably received within an upper end portion of the upper strut member; a reinforcement member received within a complementally shaped exterior peripheral recess formed in the upper strut member at a location adjacent the upper end portion of the upper strut member; and the reinforcement member having an exterior surface lying substantially flush with an exterior peripheral surface of the upper strut member for being slideably receivable within the medial strut member when the telescoping composite strut body is in the collapsed position and wherein the rectangular reinforcement member precludes the strut head from splitting the upper strut member when the telescoping composite strut body is in the extended position and side loaded.

In another aspect, an embodiment the present invention provides a reinforced telescoping member for a multiple member telescoping body of a telescoping stabilization system, the reinforced telescoping member comprising: a tubular wall having an exterior peripheral recess disposed in the tubular wall adjacent an upper end of the tubular wall, the exterior peripheral recess having a depth; and a reinforcement band located within the exterior peripheral recess and having a depth substantially no greater than the depth of the exterior peripheral recess for reinforcing the tubular wall and for being telescopically receivable within another telescoping member of the multiple member telescoping body without substantial interference.

In another aspect, an embodiment the present invention provides A method for making a reinforced telescoping member for a multiple member telescoping body of a telescoping stabilization system, the steps comprising: providing a rectangular tubular member having a rectangular sidewall having an exterior peripheral surface; forming a rectangularly shaped peripheral recess having a predetermined depth through the exterior peripheral surface of the rectangular sidewall adjacent an upper end of the rectangular tubular member; forming a rectangular reinforcement band to a shape complemental to a shape of said exterior peripheral recess; and positioning the rectangular reinforcement band within the rectangularly shaped peripheral recess for providing reinforcement to the rectangular sidewall while allowing the rectangular reinforcement band having a depth substantially no greater than the predetermined depth of the rectangularly shaped peripheral recess to slideably engage within another rectangular tubular member without substantial interference. Additionally, and in one embodiment, the above method further includes the step of using an adhesive to bond the rectangular reinforcement band to the rectangular tubular member prior to the positioning step wherein, in one embodiment, the adhesive is an epoxy.

Accordingly, having thus summarized the invention, it should be apparent that numerous modifications and adaptations may be resorted to without departing from the scope and fair meaning of the present invention as set forth hereinbelow by the claims.

DETAILED DESCRIPTION OF THE INVENTION

Considering the drawings, wherein like reference numerals denote like parts throughout the various drawing figures, reference numeral 10 is directed to a telescoping stabilization system comprising a reinforced telescoping member.

Figure 1:
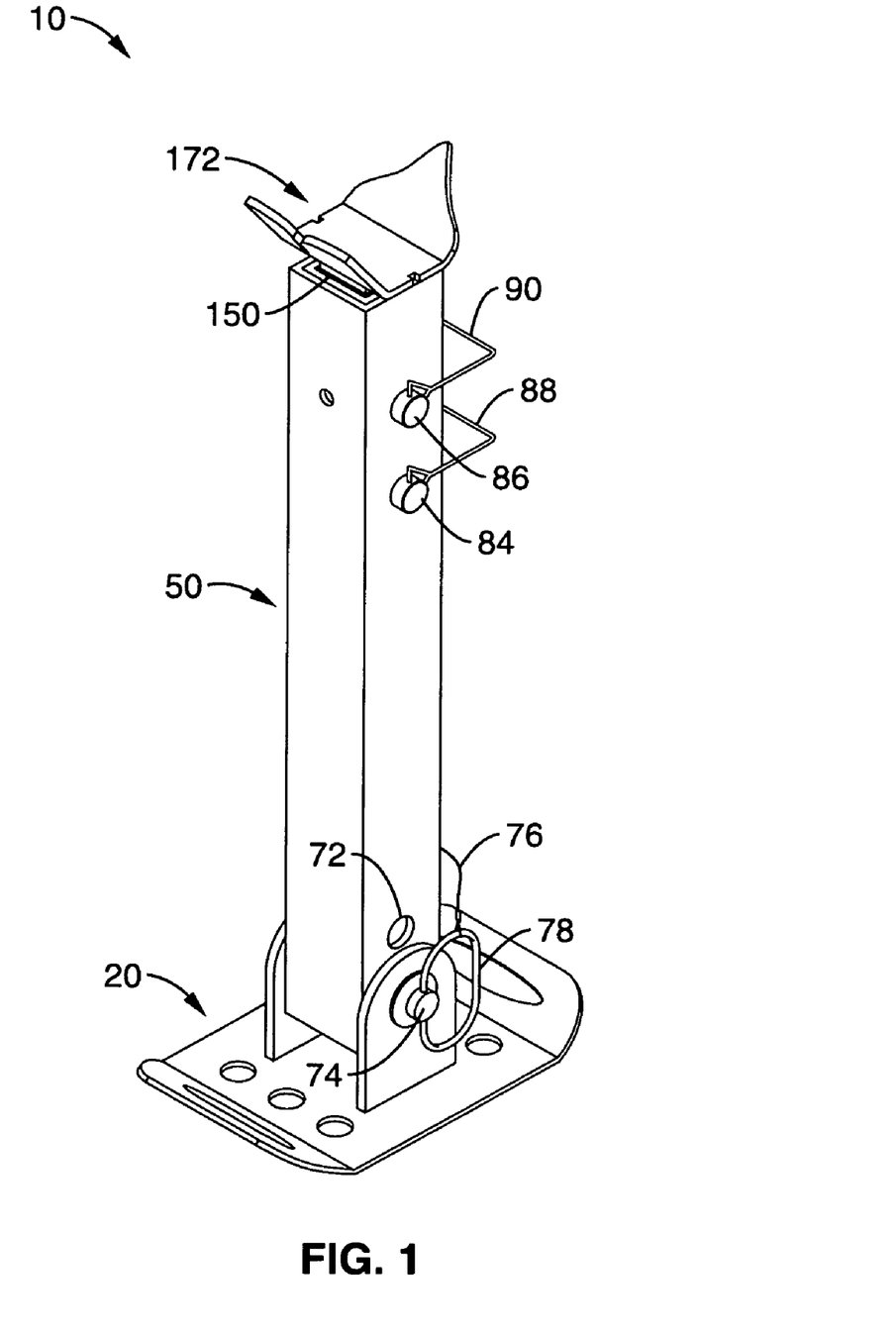
FIG. 1 is front and right side perspective view of an embodiment of a telescoping stabilization system assembled and in nested or collapsed position.
Figure 2:
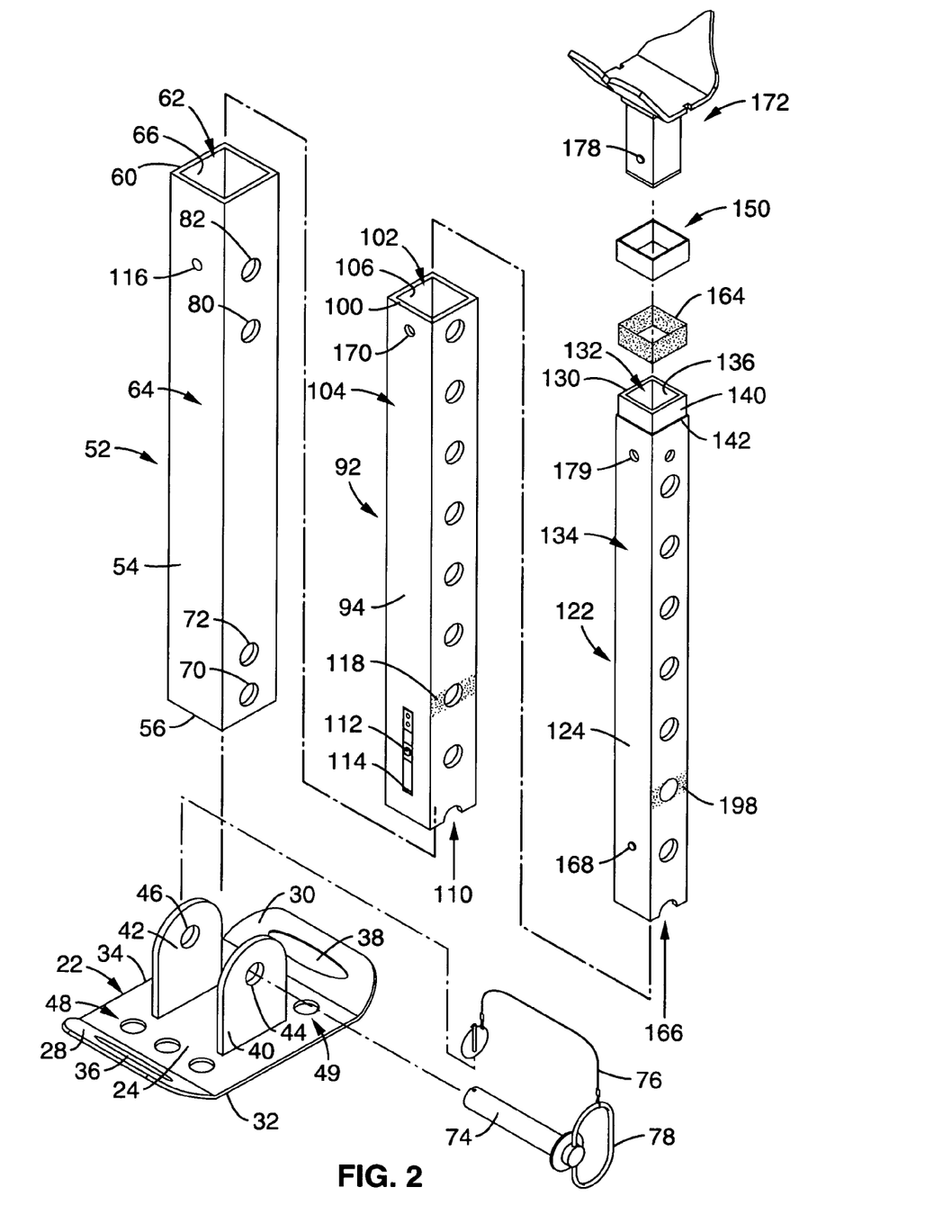
FIG. 2 is an exploded parts perspective view the telescoping stabilization system.

Referring to FIGS. 1 and 2, and in one embodiment, the telescoping stabilization system 10 is comprised of a strut base 20; a triple telescoping composite strut body 50; and an attachment or strut head such as a combination strut head 172.

Strut Base

Figure 3:
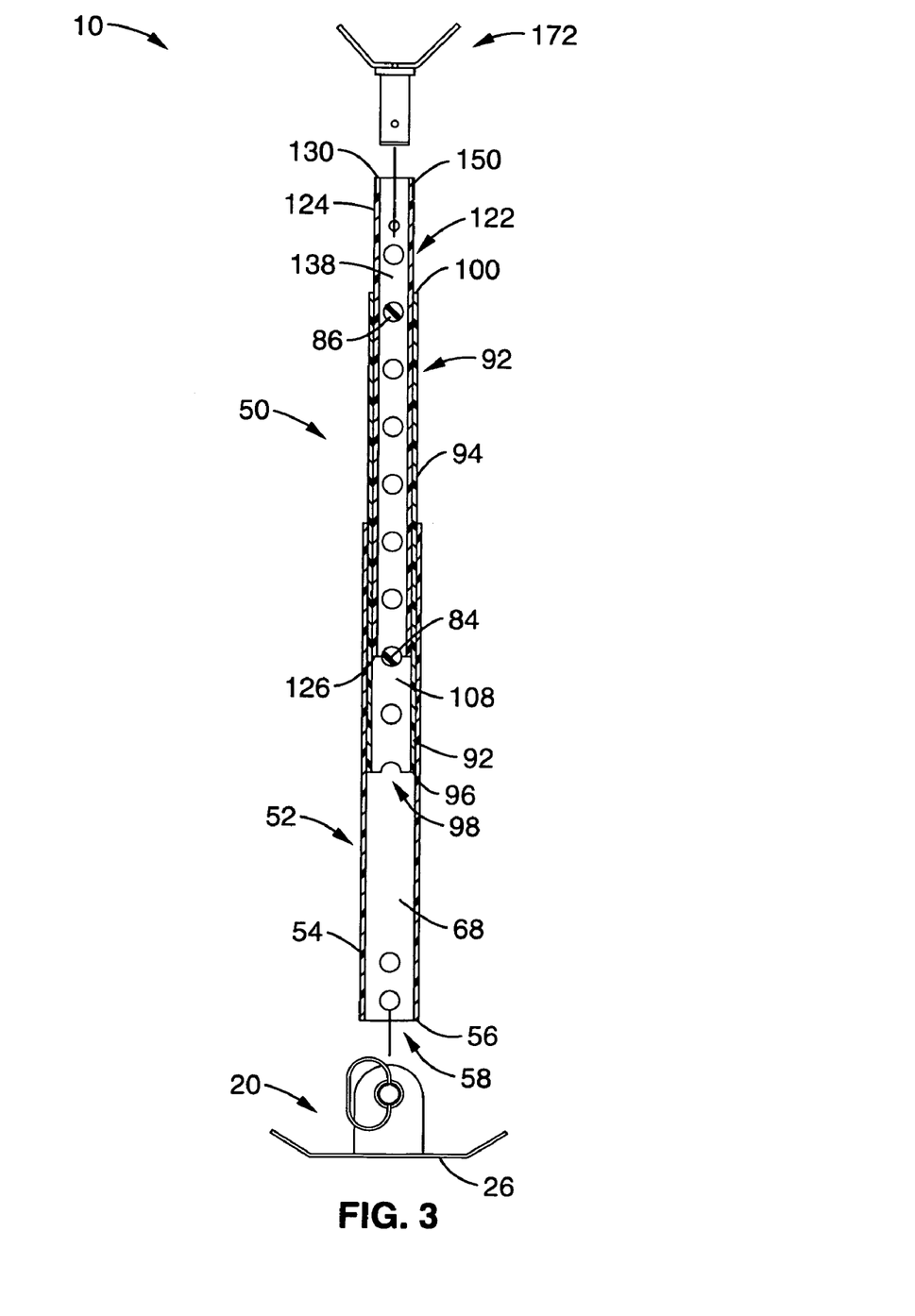
FIG. 3 is a partial sectional and a partial exploded parts plan view of the telescoping stabilization system illustrating a telescoping composite strut body of the telescoping stabilization system in a extended position.

More specifically, and referring to FIGS. 1 through 3, one embodiment of the strut base 20 is comprised of a rectangularly shaped base plate 22 having an upper surface 24, a lower surface 26 (FIG. 3), an upwardly turned forward end 28, an upwardly turned rearward end 30, and a pair of spaced apart substantially parallel sides 32 and 34.

In one embodiment, both the upwardly turned forward end 28 and the upwardly turned rearward end 30 have radiused edges. Additionally, an elongated oval strap hole 36 is disposed in the upwardly turned forward end 28 of the base plate 22 and an elongated oval strap hole 38 is disposed in the upwardly turned rearward end 30 of the base plate 22. The strut base 20 is further comprised of a pair of spaced apart upwardly extending flanges or ears 40 and 42 that are disposed at a substantially perpendicular angle with respect to the upper surface 24 of the base plate 22. Flange or ear 40 includes aperture 44 which is aligned with aperture 46 disposed in flange 42. Moreover, a series of picket holes 48 are disposed through the rectangularly shaped base plate 22 at a location between the pair of projecting flanges or ears 40, 42 and the upwardly turned forward end 28 of the strut base 20. Similarly, a series of picket holes 49 are disposed through the rectangularly shaped base plate 22 at a location between the pair of projecting flanges or ears 40, 42 and the upwardly turned rearward end 30 of the strut base 20.

In one embodiment, the strut base 20 is constructed of, but not limited to, a steel material.

Triple Telescoping Composite Strut Body

Referring to FIGS. 1 through 4, one embodiment of the triple telescoping composite strut body 50 is comprised of a lower strut or tubular member 52, a medial strut or tubular member 92 dimensioned to be closely and slideably received within the lower strut member 52, and a reinforced upper strut or tubular member 122 dimensioned to be closely and slideably received within the medial strut member 92.

Lower Strut Member

The lower strut or tubular member 52 is comprised of an elongated rectangularly shaped sidewall 54 axially-extending between a substantially flat rectangularly shaped bottom surface 56 circumscribing and defining an open bottom end 58 and a substantially flat rectangularly shaped top surface 60 circumscribing and defining an open top end 62 of the lower strut member 52. The rectangularly shaped sidewall 54 includes a substantially flat exterior surface 64 and a substantially flat interior surface 66. The interior surface 66 defines a rectangularly shaped hollow passageway 68 axially extending through the lower strut member 52 between the bottom surface 56 and the top surface 60 of the lower strut member 52.

In one embodiment, the rectangularly shaped sidewall 54 of the lower strut member 52 has a substantially uniform wall thickness of about one-quarter (¼) inch and thus, a substantially uniform rectangular cross-section.

Additionally, and in one embodiment, the lower strut member 52 is further comprised of two pairs of opposed lower base apertures 70, 72 disposed through two opposing sides of the rectangularly shaped sidewall 54 adjacent the bottom surface 56 of the lower strut member 52 wherein each pair of the lower base apertures 70, 72 allows a base plate pin 74 to be inserted therethrough. Additionally, the base plate pin 74 includes a base plate pin retainer 76 for locking the pin into position and an end loop 78 which may be used as a handle.

Furthermore, the lower strut member 52 is further comprised of two pairs of opposed upper adjustment apertures 80, 82 disposed through two opposing sides of the rectangularly shaped sidewall 54 adjacent the top surface 60 of the lower strut member 52 wherein each pair of the upper adjustment apertures 80, 82 allows a first strut pin 84 or a second strut pin 86 to be inserted therethrough. Additionally, the strut pins 84 and 86 include pin retainers 88 and 90 respectively.

Medial Strut Member

The medial strut or tubular member 92 is comprised of an elongated rectangularly shaped sidewall 94 axially-extending between a substantially flat rectangularly shaped bottom surface 96 circumscribing and defining an open bottom end 98 and a substantially flat rectangularly shaped top surface 100 circumscribing and defining an open top end 102 of the medial strut member 92. The rectangularly shaped sidewall 94 includes a substantially flat exterior surface 104 and a substantially flat interior surface 106. The interior surface 106 defines a rectangularly shaped hollow passageway 108 extending through the medial strut member 92 between the bottom surface 96 and the top surface 100 of the medial strut member 92.

In one embodiment, the rectangularly shaped sidewall 94 of the medial strut member 92 has a substantially uniform wall thickness of about one-quarter (¼) inch and thus, a substantially uniform rectangular cross-section.

Additionally, and in one embodiment, the medial strut member 92 is further comprised of a series of spaced apart adjustment aperture pairs 110 with one aperture in each pair disposed through one side of the rectangularly shaped sidewall 94 of the medial strut member 92 and the other aperture in each pair disposed through an opposing side of the rectangularly shaped sidewall 94 of the medial strut member 92 wherein each adjustment aperture pair in the series of spaced apart adjustment aperture pairs 110 allows the first strut pin 84 or the second strut pin 86 to be inserted therethrough.

Accordingly, when the medial strut member 92 is telescopically received within the lower strut member 52 one of the adjustment aperture pairs in the series of spaced apart adjustment aperture pairs 110 can be aligned with one of the two pairs of opposed upper adjustment apertures 80, 82 disposed in the lower strut member 52 and one of the strut pins 84, 86 can be inserted therethrough for adjusting the extension of the medial strut member 92 with respect to the lower strut member 52 and thus, the extension of the triple telescoping composite strut body 50.

Moreover, the medial strut member 92 includes an interlocking or indexing system comprised of a spring mounted button 112 mounted inside a pocket 114 within the rectangularly shaped sidewall 94 of the medial strut member 92. The button 112 is received within a button aperture 116 disposed in the sidewall 54 of the lower strut member 52 when aligned for interlocking or indexing the medial strut member 92 relative to the lower strut member 52 thereby providing a stop to prevent the medial strut 92 from being overextended and to allow the user to simply pull out as much of the medial strut member 92 as needed.

The interlocking or indexing system comprised of the spring mounted button 112 mounted inside the pocket 114 is the subject matter of applicants co-pending U.S. patent application Ser. No. 11/787,153, filed on Apr. 13, 2007 and is incorporated herein by reference in its entirety.

Upper Strut Member With Reinforcement Band

Figure 4:
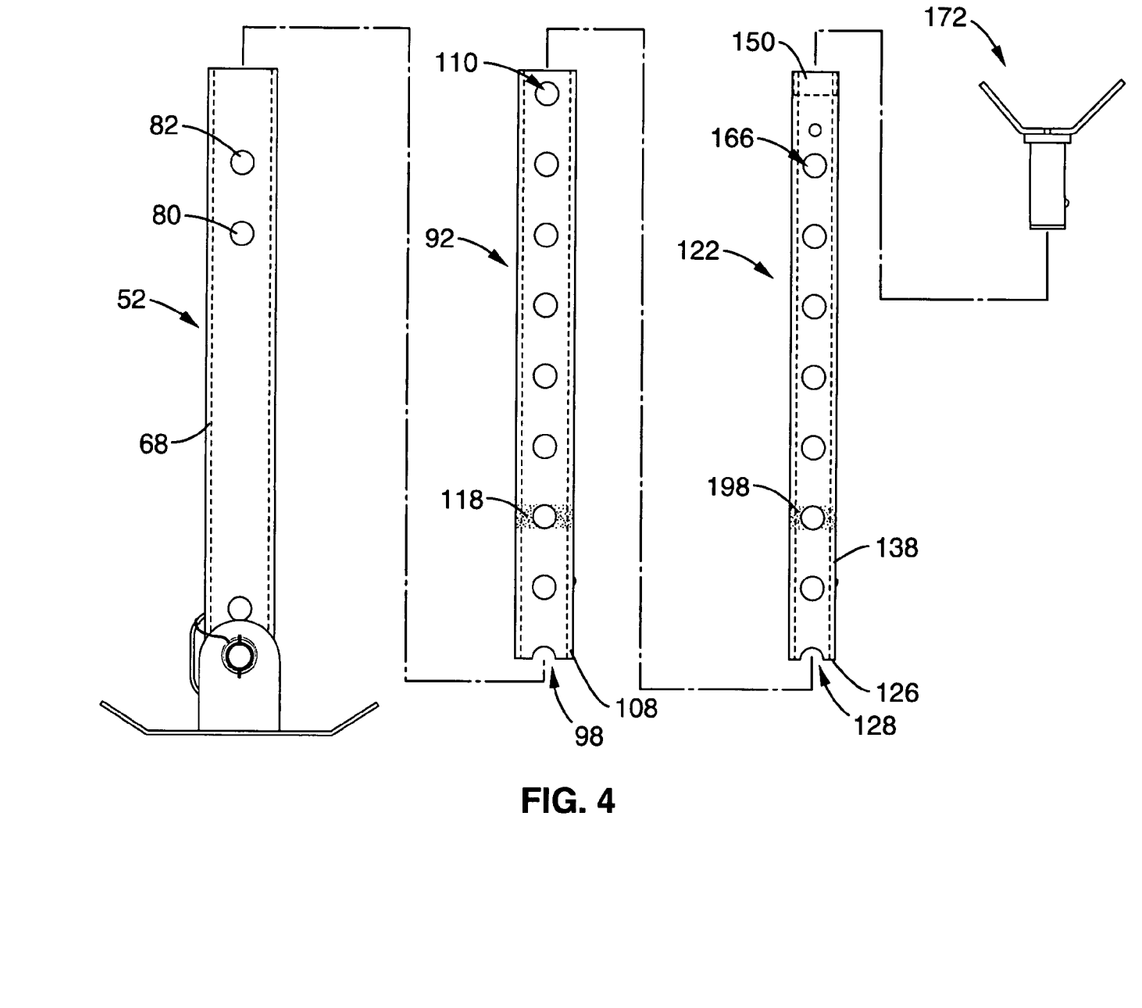
FIG. 4 is a left side partial exploded parts plan view of the telescoping stabilization system.

The upper strut or tubular member 122 is comprised of an elongated rectangularly shaped sidewall 124 axially-extending between a substantially flat rectangularly shaped bottom surface 126 circumscribing and defining an open bottom end 128 and a substantially flat rectangularly shaped top surface 130 circumscribing and defining an open top end 132 of the upper strut member 122. The rectangularly shaped sidewall 124 includes a substantially flat exterior surface 134 and a substantially flat interior surface 136. The interior surface 136 defines a rectangularly shaped hollow passageway 138 axially extending through the upper strut member 122 between the bottom surface 126 and the top surface 130 of the upper strut member 122.

The rectangularly shaped sidewall includes a peripheral recess 140 having a predetermined depth. The peripheral recess 140 is located adjacent the open top end 132 of the upper strut member 122. In one embodiment, the peripheral recess 140 axially extends from the substantially flat rectangularly shaped top surface 130 to a substantially flat rectangularly shaped shoulder surface 142 located at a predetermined distance below the rectangularly shaped top surface 130 and substantially parallel thereto. Accordingly, the rectangularly shaped sidewall 124 of the upper strut member 122 is divided into a first rectangularly shaped sidewall section having a substantially uniform first sidewall thickness axially extending between the substantially flat rectangularly shaped bottom surface 126 of the upper strut member 122 to the substantially flat rectangularly shaped shoulder surface 142 and a second rectangularly shaped sidewall section defining a rectangularly shaped recessed sidewall section having a substantially uniform second sidewall thickness less than the first sidewall thickness and axially extending between the substantially flat rectangularly shaped shoulder surface 142 and the substantially flat rectangularly shaped top surface 130 of the upper strut member 122. The rectangularly shaped recessed sidewall includes an outer peripheral surface 144 (FIG. 5) recessed from the outer peripheral surface 134 (FIG. 2) of the first rectangularly shaped sidewall section and limiting the depth of the peripheral recess 140.

Figure 5:
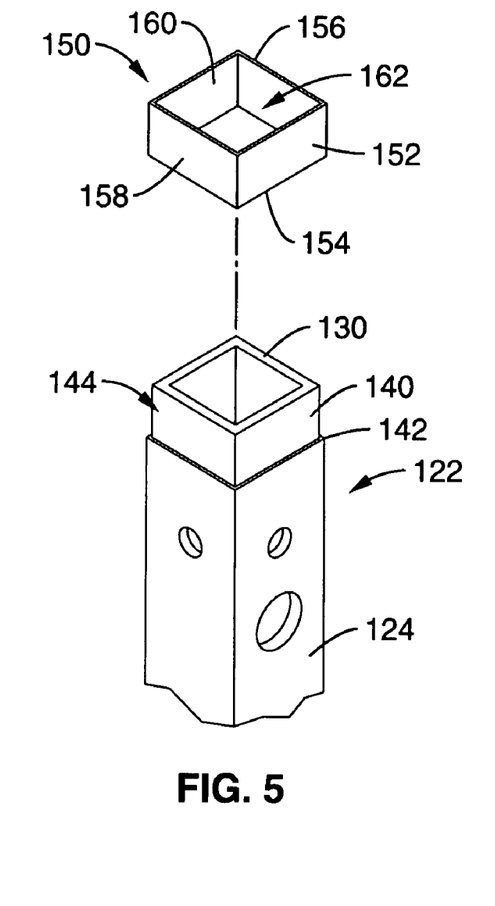
FIG. 5 is front and right side exploded parts perspective view of an inner strut member shown fragmented and a reinforcement band of the telescoping composite strut body of the telescoping stabilization system.

In one embodiment, the first sidewall thickness of the upper strut member 122 has a substantially uniform wall thickness of about of about one-quarter (¼) inch while the second sidewall thickness or the thickness of the recessed sidewall is about three-sixteenth (³⁄₁₆) inch and thus, both the first rectangularly shaped sidewall section and the second rectangularly shaped sidewall section or rectangularly shaped recessed sidewall have a substantially uniform rectangular cross-section. The recess is about one-sixteenth (1/16) inch in depth when the first sidewall thickness is about one-quarter (1/4) inch and the recessed sidewall is about three-sixteenth (3/16) inch.

Reinforcement Band

Additionally, and referring to FIGS. 2 and 5, the upper strut or tubular member 122 is further comprised of a rectangularly shaped reinforcement band 150 comprised of a rectangularly shaped sidewall 152 axially-extending between a substantially flat rectangularly shaped bottom surface 154 circumscribing and defining an open bottom end and a substantially flat rectangularly shaped top surface 156 circumscribing and defining an open top end of the reinforcement band 150. The rectangularly shaped sidewall 152 includes a substantially flat exterior surface 158 and a substantially flat interior surface 160. The substantially flat interior defines a rectangularly shaped open ended hollow passageway 162 axially extending through the reinforcement band 150 between the bottom surface 154 and the top surface 156.

In one embodiment, the rectangularly shaped sidewall 152 of the reinforcement band has a substantially uniform wall thickness of about one-sixteenth (1/16) inch and thus, a substantially uniform rectangular cross-section.

Figure 6:
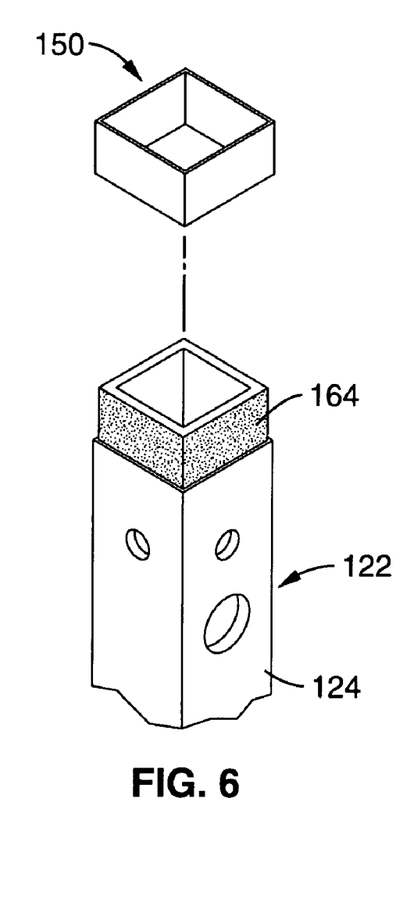
FIG. 6 is front and right side exploded parts perspective view of the reinforcement band and the fragmented inner strut member illustrated in FIG. 5 and further illustrating an adhesive applied to an exterior peripheral surface of a recessed sidewall of the inner strut member.

Referring to FIGS. 2, 5, and 6, and in one embodiment, a layer of adhesive 164 is applied between the interior surface 160 of the rectangular reinforcement band 150 and the outer peripheral surface 144. The adhesive layer 164 can be formed by applying adhesive to the outer peripheral surface 144, to the interior surface 160 of the rectangular reinforcement band 150, or to both.

Referring to FIGS. 2, and 5 through 7, and after the adhesive layer 164 is applied, the rectangular reinforcement band 150 is positioned within the peripheral recess 140 such that the interior surface 160 of the rectangular reinforcement band 150 circumscribes the outer peripheral surface 144 with the adhesive 164 interposed therebetween and such that the substantially flat rectangularly shaped bottom surface 154 of the reinforcement band 150 abuts with the substantially flat rectangularly shaped shoulder surface 142 of the upper strut member 122 while the substantially flat rectangularly shaped top surface 156 of the reinforcement band 150 sits flush with the substantially flat rectangularly shaped top surface 130 of the upper strut member 122.

Figure 7:
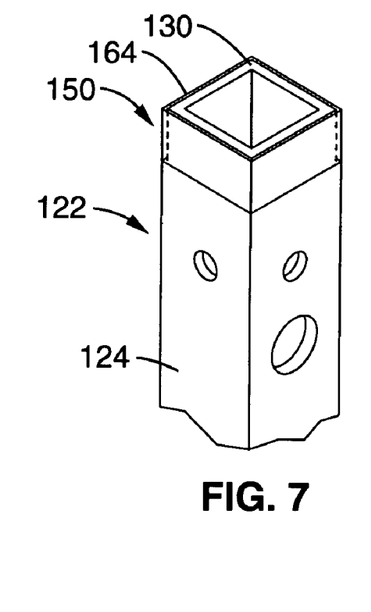
FIG. 7 is front and right side perspective view of the fragmented inner strut member illustrated in FIG. 6 and a flush mounting of the reinforcement band with the inner strut member and with the adhesive interposed between an interior surface of the reinforcement band and the exterior peripheral surface of recessed sidewall of the inner strut member.
Figure 8:
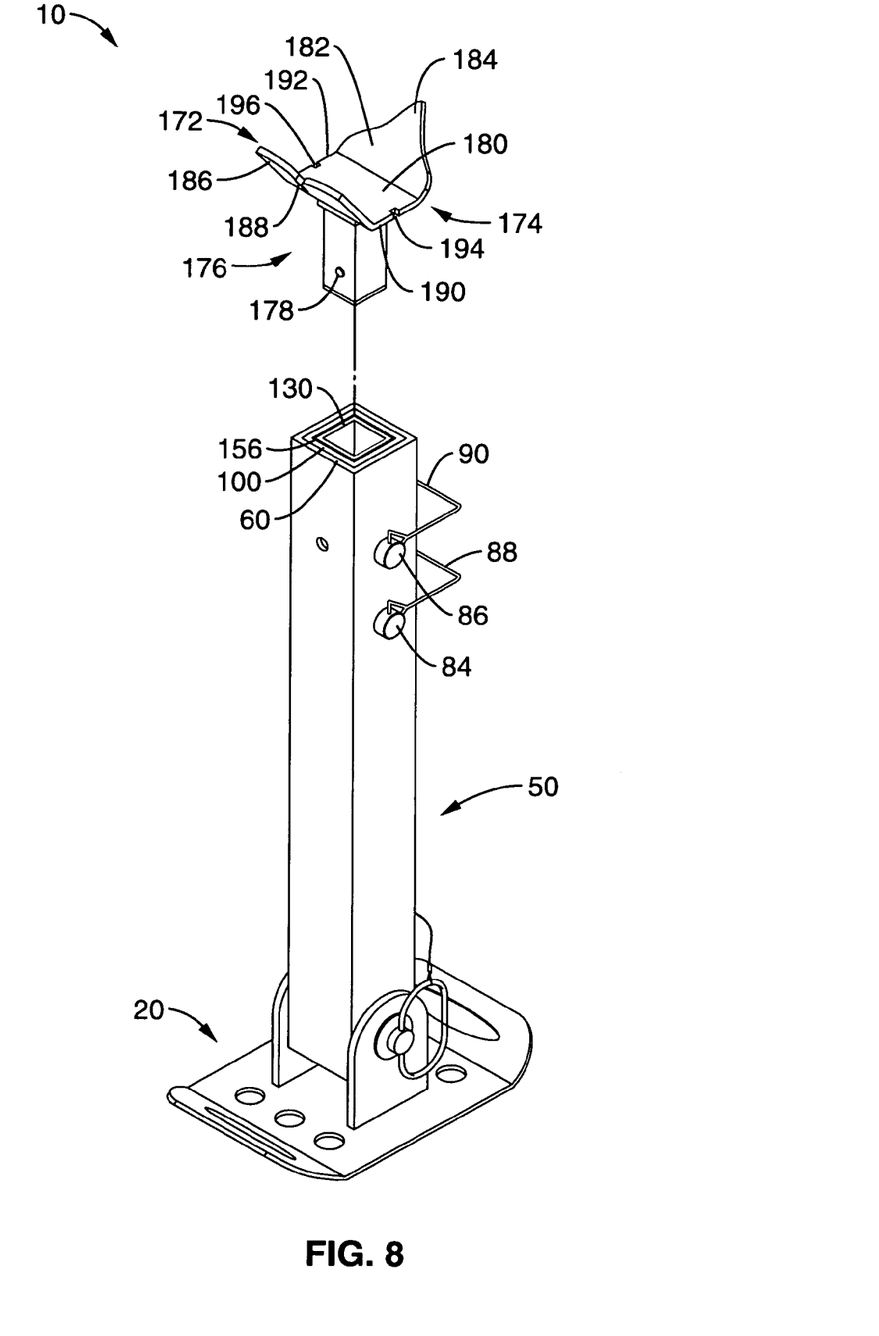
FIG. 8 is a front and right side perspective view of the telescoping stabilization system in a collapsed position with a strut head detached therefrom.

Referring to FIGS. 2, 7, and 8, and once the reinforcement band 150 is positioned within the peripheral recess 140, the substantially flat exterior surface 158 of the rectangular reinforcement band 150 mates substantially flush with the substantially flat exterior surface 134 of the upper strut member 122 for allowing the upper strut member 122 with the attached rectangular reinforcement band 150 to fully telescope within the medial strut member 92 without substantial interference and such that the substantially flat rectangularly shaped top surface 156 of the reinforcement band 150 sits flush with the substantially flat rectangularly shaped top surface 130 of the upper strut member 122, the substantially flat rectangularly shaped top surface 100 of the medial strut member 92, and the substantially flat rectangularly shaped top surface 60 of the outer strut member 62 as illustrated in FIG. 8.

When the telescoping composite strut body 50 is extended, the rectangular reinforcement band 150 precludes lateral forces acting on the interior peripheral surface 136 proximate the open top end 132 from splitting the rectangularly shaped sidewall 124 of the upper strut or tubular member 122. These lateral forces are typically engendered when the telescoping composite strut body 50 is coupled between the strut base 20 and the strut head 172, extended, and under a side loading condition exemplified by force 210 (FIG. 9) along the length of the extended strut body 50 such as that provided by an abutment at a position along the length of the extended telescoping composite strut body 50 with an object such as a part of a vehicle.

In addition to providing reinforcement for upper strut or tubular member 122, the rectangular reinforcement band 150 has a depth substantially no greater than the depth of the rectangularly shaped peripheral recess for being slideably received within the medial strut or tubular member 92 without substantial interference as noted above and illustrated in FIG. 8.

Referring back to FIGS. 2 through 4, the upper strut or tubular member 122 is further comprised of a series of spaced apart adjustment aperture pairs 166 with one aperture in each pair disposed through one side of the rectangularly shaped sidewall 124 of the upper strut member 122 and the other aperture in each pair disposed through an opposing side of the rectangularly shaped sidewall 124 of the upper strut member 122 wherein each adjustment aperture pair in the series of spaced apart adjustment aperture pairs 166 allows the first strut pin 84 or the second strut pin 86 to be inserted therethrough.

Accordingly, when the upper strut member 122 is extended from the medial strut member 92 one of the adjustment aperture pairs 166 disposed in the upper member 122 is aligned with one of the adjustment aperture pairs 110 disposed in the medial strut member 92 and one of the strut pins 84 or 86 is inserted therethrough for adjusting the extension of the upper strut member 122 with respect to the medial strut member 92 thereby adjusting the extension of the triple telescoping composite strut body 50.

Moreover, the upper strut member 122 includes an interlocking or indexing system comprised of a spring mounted button 168 mounted within the upper strut member 122. The button 168 is received within a button aperture 170 disposed in the rectangularly shaped sidewall 94 of the medial strut member 92 when aligned for interlocking or indexing the upper strut member 122 relative to the medial strut member 92 thereby providing a stop to prevent the upper strut member 122 from being overextended and to allow the user to simply pull out as much of the upper strut member 122 as needed.

Strut Material

In one embodiment, the lower strut member 52, the medial strut member 92, and the upper strut member 122 are all constructed of, but not limited to, a Kevlar® composite material which is a non-conductive composite material which provides a layer of protection against electrocution from batteries, hybrid/electric vehicle power systems, low hanging power lines, and other electrical hazards. Additionally, this material makes the triple telescoping composite strut body 50 nearly impervious to all types of environmental and chemically corrosive materials including water, salt, battery acid, fuels and UV rays. Furthermore, this material can be milled to form the recess 140 in an upper portion of the upper strut member 122.

Reinforcement Band Material

Additionally, and in one embodiment, the rectangularly shaped reinforcement band 150 is constructed of, but not limited to, an aluminum material. The band can be formed from a strip of aluminum that is bent to shape and welded at its ends or machined from a mass of aluminum.

Combination Strut Head

Referring to FIGS. 2 and 8, the telescoping stabilization system 10 is further comprised of a strut head which, in one embodiment, is in the form of the combination strut head 172. The combination strut head 172 is comprised of a U-shaped head 174 rotatably mounted on a lower rectangular shaft 176 having a spring mounted button 178 mounted therein. The lower rectangular shaft 176 is received through the open upper end 132 and into the upper strut member 122 adjacent the rectangular reinforcement band 150 until the spring button 178 indexes or interlocks with an aperture 179 disposed through the sidewall 124 of the upper strut member 122. The U-shaped head 174 includes a flat rectangularly shaped center portion 180 transitioning on one side to an upwardly turned spade shaped section 182 terminating to a point 184 and transitioning on an opposing side to an upwardly turned generally rectangularly shaped section 186 bifurcated by a medial notch or chain slot 188. The flat rectangularly shaped center portion 180 includes two spaced apart substantially parallel sides 190 and 192. Side 190 is provided with a nail notch 194 and side 192 is provided with a nail notch 196.

In general, the telescoping stabilization system 10 can employ a variety of different style strut heads such as a jack head, an A-frame head, and a tripod head which are respectively sold under part numbers CTC-507, CTC-508, and CTC522 or CTC523 by Rescue 42, Inc., P.O. Box 1242 Chico, Calif. 95927.

Additionally, the telescoping stabilization system 10 can employ a variety of different base styles such as strut base 20 or a spike foot or base sold under part number CTC-511 by Rescue 42, Inc., P.O. Box 1242 Chico, Calif. 95927.

The spike foot base is coupled to the bottom open end 58 of the lower strut 52 member and is normally used with the screw jack head coupled to the top open end 132 in the upper strut member 122. The Spike Foot will allow the system 10 to anchor to concrete edges, corners, rebar, highway barrier cables or rails, wood, metal protrusions, or any other area where the standard strut base may not work.

Furthermore, the telescoping stabilization system 10 typically employs a ratchet strap 200 (FIG. 9) as will be further delineated below. One example of such a ratchet strap is sold under part number CTC-504 by Rescue 42, Inc., P.O. Box 1242 Chico, Calif. 95927.

Moreover, the telescoping stabilization system 10 can employ a strut jack to extend the strut members. One example of such a strut jack is sold under part number CTC-503 by Rescue 42, Inc., P.O. Box 1242 Chico, Calif. 95927.

Assembling

Referring to FIGS. 1 through 8, the telescoping stabilization system 10 can be assembled by passing the upper strut or tubular member 122 through the open bottom end of the medial strut or tubular member 92 and passing the medial strut or tubular member 92 with the upper strut or tubular member 122 telescoped therein through the open bottom end of the lower strut or tubular member 52.

Next, pin the bottom most pair of base apertures in the lower strut or tubular member to the holes in the base plate ears using the steel base plate pin 74 which, in one embodiment, is a 1" diameter steel base plate pin. Be careful to insert the pin through the outer or lower strut or tubular member only.

Next, push the spring mounted button 178 on the combination strut head 172 and slide the combination strut head into the open top end of the inner or upper strut or tubular member 122 until it stops and the spring mounted button snaps into aperture 179 disposed through the sidewall 124 of the inner or upper strut or tubular member 122.

Then, pin the members together with pins 84, 86 and secure using loops 88, 90 as illustrated in FIGS. 1 and 8. The telescoping stabilization system 10 is now assembled and the end loop 78 can be used as a handle for positioning the telescoping stabilization system 10. The telescoping stabilization system 10 can be disassembled by reversing the above procedures

Extending

To extend the triple telescoping composite strut body 50, simply remove the two strut pins 84, 86 and gently pull out on the combination head 172 until you have extended as much telescoping composite strut body as you need and then pin or interlock by aligning the upper most pair of adjustment apertures 82 in the lower strut or tubular member 52 with one of the adjustment aperture pairs in the series of spaced apart adjustment aperture pairs 110 in the medial strut or tubular member 92 and pass pin 84 therethrough and secure its pin loop 88 thereto. Similarly, align one adjustment aperture pair in the series of spaced apart adjustment aperture pairs 166 in the upper or inner strut or tubular member 122 with one adjustment aperture pair in the series of spaced apart adjustment aperture pairs 110 in the medial strut or tubular member 92 and pass pin 86 therethrough and secure its pin loop 90 thereto.

Maximum extension of the telescoping composite strut is indexed by spring buttons 112, 168 as is also delineated above. Any overextension past an interlock will expose orange safety bars or demarcations 118, 198 on respective members 92, 122 indicating an unsafe condition. Never pin the strut members with any of the orange safety bars or demarcations 118, 198 exposed.

In an emergency, a spare base plate pin may be used as strut pins; however, do not use composite strut pins in place of the steel base plate pin. Additionally, one can double pin the base plate to increase load capacity by placing an additionally base plate pin through the pair of base apertures in the lower strut or tubular member directly above the base plate ears. Furthermore, strut members can be double pinned by placing additional strut pins through aligned pairs of adjustment apertures in the lower and medial strut members and through aligned pairs of adjustment apertures in the medial and upper strut members.

Moreover, and once extended, the rectangular reinforcement band 150 precludes lateral forces from the shaft 176 of the combination head 172 resulting from side loading conditions on the telescoping composite strut body 50 from acting on the interior peripheral surface 136 proximate the open top end 132 and splitting the rectangularly shaped sidewall 124 of the upper strut or tubular member 122 thereby causing failure of the stabilization system 10 as a result of the side loading conditions on the telescoping composite strut body 50.

Collapsing

To collapse the triple telescoping composite strut body 50, remove the strut pins 84, 86 from the strut members and slide the strut members together until they stop. Reinstall the strut pins 84, 86 in the multiple pairs of opposed upper adjustment apertures in the lower strut member 52 as illustrated in FIG. 1. Hence, the strut is ready for transport or storage.

Use and Operation

In use and operation, and referring to the drawings, one or more telescoping stabilization systems 10 can be employed in a variety of orientations to provide stabilization of, for example, one or more vehicles in a crash situation.

In the field, one or more telescoping stabilization systems 10 are typically preassembled as delineated above and ready to be employed. Thus, for a vehicle accident, the user first analyses the situation to establish a plan for patient extrication. In accordance with the plan, the user extends the triple telescoping composite strut body 50 which, can be manufactured in a variety of lengths, so that it will end up between 45 degrees and 70 degrees relative to the vehicle when tightened with, for example, a ratchet strap 200 as exemplified in FIG. 9. Then, the user anchors the combination head 172 against the vehicle. The combination head 172 rotates to grab at any angle and to prevent twisting of the struts. The point 184 of the head 172 will anchor almost anywhere and the notch or slot 188 is designed to crab edges or a chain. As a last resort, one can use the point 184 to penetrate the skin of vehicles such as cars, trucks, or aircraft to anchor the combination head 172. The point 184 may be driven into the material or placed into a preexisting hole.

Figure 9:
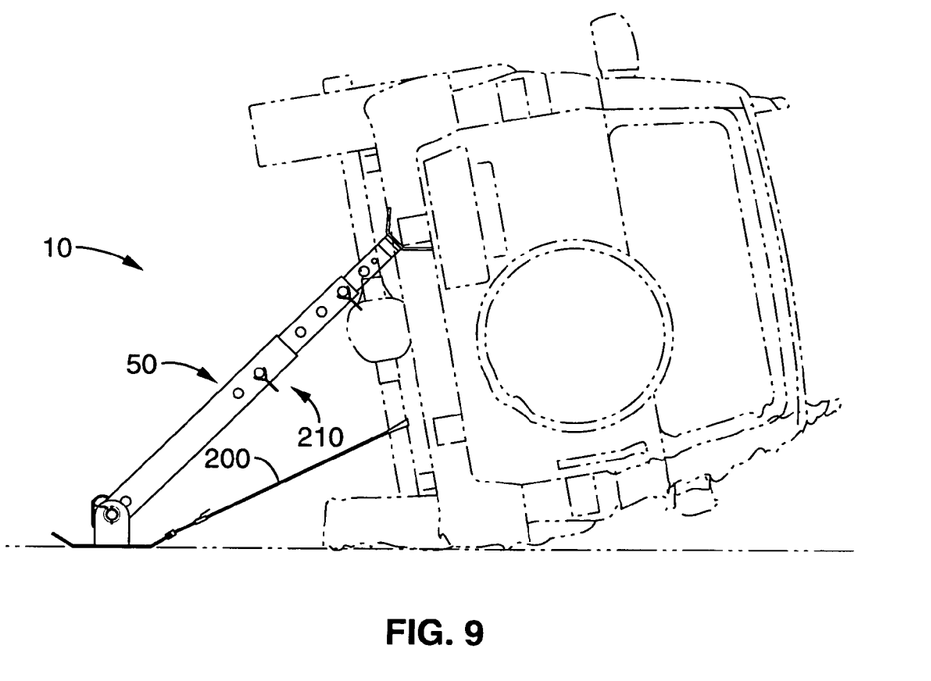
FIG. 9 is a plan view of one embodiment of the telescoping stabilization system in one embodiment of use.

With the combination head 172 firmly anchored, the user positions the strap 200 from the base plate 20 to the vehicle or to another strut base plate 20 and then tightens the ratchet strap 200 slightly. This process is repeated on the other side of the vehicle, and as many times as necessary until a desired number of telescoping stabilization systems 10 are in place. When all necessary telescoping stabilization systems 10 are in place, the user tightens the respective ratchet straps 200 until the desired stability is achieved. It should be noted that the telescoping stabilization systems 10 may be tightened into place either with a strap, pulling tool, strut jack or screw jack head. Be careful not to over tighten ratchet strap 200 and move the vehicle.

Accordingly, straps may used in many ways to tighten the system. One of the easiest methods is pulling directly from the base plate to the car. This may be done with a strap hook or in conjunction with a hook cluster or with a t-hook which is designed to be received within a slot in an underside of most cars.

Another common method is to pull two base plates toward each other with a strap. One advantage is to pass the strap hook through the oval strap holes 36, 38 in the base plate 20 thereby allowing one to use anchor points which are not aligned with the strut.

Some possible scenarios for use and operation of the telescoping stabilization system 10 include stabilizing a vehicle on its side with three or four telescoping stabilization systems 10 being employed by placing one or two of the telescoping stabilization systems 10 against the bottom of the vehicle, one at the hood of the vehicle, and one at the trunk of the vehicle. In another scenario, a vehicle on its roof can employ two telescoping stabilization systems 10 deployed under the trunk of the car. In another scenario, a vehicle on its roof can employ two telescoping stabilization systems 10 deployed under the trunk of the car and two telescoping stabilization systems 10 deployed under the hood of the car. In another scenario, with one vehicle stacked on another one can employ two telescoping stabilization systems 10 under the front of the upper car and two telescoping stabilization systems 10 under the back of the upper car. The possible uses for the telescoping stabilization system 10 are virtually limitless.

In another aspect of use and operation, and if a user runs into a situation where the user cannot or does not want to use a strap to tighten the strut, the user may drive pickets through the picket holes 48, 49 in the base plate 22 to anchor it. Then the user can attach the screw jack head noted above and sold by Rescue 42, Inc. to the top of the upper strut 122 and extend into position by twisting the jack head.

In another aspect of use and operation, the telescoping stabilization systems 10 can employ the spike foot or base noted above and sold by Rescue 42, Inc. with its aggressive spikes which can bite into concrete, metal, wood, or perch on rebar, cables, et cetera.

In another aspect of use and operation, two telescoping stabilization systems 10 can employ chains with the combination strut heads 172 of the two systems by placing a portion of one end of the chain in one chain slot 188 of one strut head 172 and placing a portion of the other end of the chain in another chain slot 188 of another strut head 172 for building a saddle under a load between two telescoping stabilization systems 10. In one embodiment, ⅜ inch 70 grade or 80 grade chains are employed. Chains can also be used with one or more telescoping stabilization systems 10 to control loads as the systems stabilize the loads.

In another aspect of use and operation, and referring to FIG. 8, the flat rectangularly shaped center portion 180 of the combination strut head 172 can be used to support 2 by 4 or 2 by 6 boards used in ceiling and floors so that the telescoping stabilization systems 10 can be used for light structural support. Nail notches 194, 196 in the sides of the combination strut head 172 allows the user to hammer nails into the board via the notches 194, 196 for adding additional support.

In another aspect of use and operation, the telescoping stabilization system 10 can employ the A-frame head noted above and sold by Rescue 42, Inc. for supporting a load above the head by strapping the load onto a top of the A-frame head or for supporting a load below the A-frame head by strapping the load onto a lower end of the A-frame head.

In another aspect of use and operation, the telescoping stabilization system 10 can employ the strut jack noted above and sold by Rescue 42, Inc. for extending the strut members.

Accordingly, and in one aspect, the telescoping stabilization system 10 can be employed for vehicle, machinery, aircraft, and light structural rescue or salvage.

Figure 10:
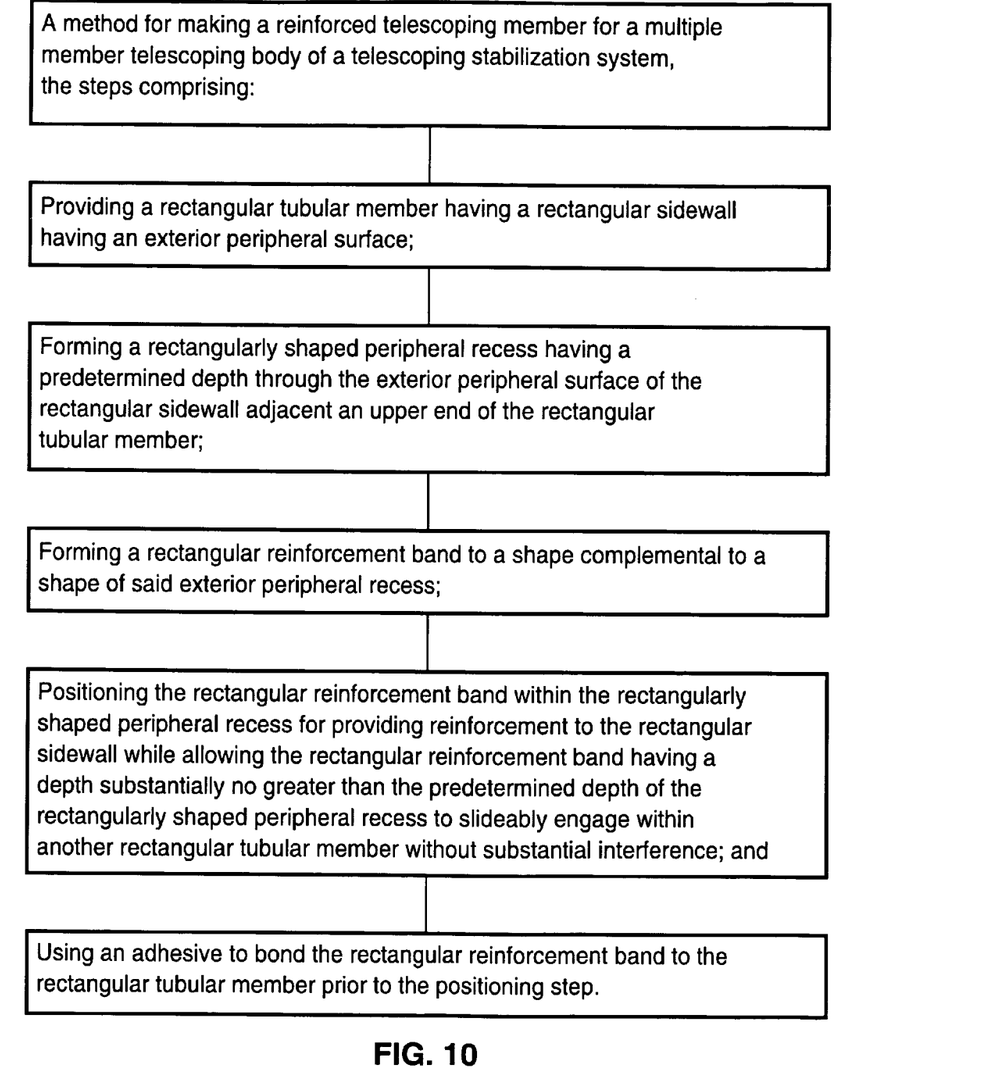
FIG. 10 is a flow diagram of an embodiment of a method for making a reinforced telescoping strut member of the telescoping composite strut body of the telescoping stabilization system.

Referring to FIG. 10, and in another aspect, an embodiment the present invention provides a method for making a reinforced telescoping member for a multiple member telescoping body of a telescoping stabilization system, the steps comprising: providing a rectangular tubular member having a rectangular sidewall having an exterior peripheral surface; forming a rectangularly shaped peripheral recess having a predetermined depth through the exterior peripheral surface of the rectangular sidewall adjacent an upper end of the rectangular tubular member; forming a rectangular reinforcement band to a shape complemental to a shape of said exterior peripheral recess; and positioning the rectangular reinforcement band within the rectangularly shaped peripheral recess for providing reinforcement to the rectangular sidewall while allowing the rectangular reinforcement band having a depth substantially no greater than the predetermined depth of the rectangularly shaped peripheral recess to slideably engage within another rectangular tubular member without substantial interference. Additionally, and in one embodiment, the above method further includes the step of using an adhesive to bond the rectangular reinforcement band to the rectangular tubular member prior to the positioning step wherein, in one embodiment, the adhesive is an epoxy.

These aspects, along with the above delineation of the telescoping stabilization system 10, including its use and operation, demonstrate the industrial applicability of this invention.

Moreover, having thus described the present invention, it should be apparent that numerous modifications and adaptations may be resorted to without departing from the scope and fair meaning of the present invention as set forth hereinabove and as described hereinbelow by the claims.

I claim:

1. A telescoping stabilization system, said system comprising:
    a first tubular member having an exterior peripheral surface and a substantially rectangular cross section;
    a second tubular member having a substantially rectangular cross section wherein said first tubular member is slideably engaged within said second tubular member;
    a rectangular reinforcement band received within a complementally shaped exterior peripheral recess formed in an upper end portion of said first tubular member for reinforcing said first tubular member; and
    said rectangular reinforcement band having an exterior surface lying substantially flush with said exterior peripheral surface of said first tubular member for being slideably receivable within said second tubular member without substantial interference therebetween.

2. The system of claim 1 further comprising a third tubular member having a substantially rectangular cross section wherein said second tubular member is slideably engaged within said third tubular member.

3. The system of claim 2 further comprising a base pivotally coupled to a lower end of said third tubular member.

4. The system of claim 3 further comprising an attachment head having a rectangular tubular shaft received at least partially within said first tubular member through an open upper end of said first tubular member at a location adjacent said upper end portion of said first tubular member wherein said rectangular tubular shaft provides lateral forces on an interior peripheral surface of said first tubular member when said system is under a side loaded condition and wherein said rectangular reinforcement band precludes said lateral forces from splitting said first tubular member.

5. The system of claim 4 wherein said first, second, and third tubular members are formed from a Kevlar composite material.

6. The system of claim 5 wherein said rectangular reinforcement band is formed from an aluminum material.

7. The system of claim 6 further comprising an adhesive layer bonding said rectangular reinforcement band within said exterior peripheral recess.

8. A telescoping stabilization system, said system comprising:
    a base;
    a telescoping composite strut body comprised of a lower strut member having a lower end pivotally coupled to said base, a medial strut member telescopically received within said lower strut member, and an upper strut member telescopically received within said medial strut member so that said telescoping composite strut body is telescopically adjustable between an extended position and a collapsed position;
    a strut head having a shaft releasably received within an upper end portion of said upper strut member;
    a reinforcement member received within a complementally shaped exterior peripheral recess formed in said upper strut member at a location adjacent said upper end portion of said upper strut member; and
    said reinforcement member having an exterior surface lying substantially flush with an exterior peripheral surface of said upper strut member for being slideably receivable within said medial strut member when said telescoping composite strut body is in said collapsed position and wherein said rectangular reinforcement member precludes said strut head from splitting said upper strut member when said telescoping composite strut body is in said extended position and side loaded.

9. The system of claim 8 wherein said lower strut member, said medial strut member, and said upper strut member each have a substantially rectangularly cross-section.

10. The system of claim 9 wherein said reinforcement member has a substantially rectangularly cross-section.

11. The system of claim 10 wherein said lower, medial, and upper strut members are each formed from a Kevlar composite material.

12. The system of claim 11 wherein said reinforcement member is formed from an aluminum material.

13. The system of claim 12 further comprising an adhesive layer bonding said reinforcement member within said exterior peripheral recess.

14. A reinforced telescoping member for a multiple member telescoping body of a telescoping stabilization system, said reinforced telescoping member comprising:
    a tubular wall having an exterior peripheral recess disposed in said tubular wall adjacent an upper end of said tubular wall, said exterior peripheral recess having a depth; and
    a reinforcement band located within said exterior peripheral recess and having a depth substantially no greater than said depth of said exterior peripheral recess for reinforcing said tubular wall and for being telescopically receivable within another telescoping member of said multiple member telescoping body without substantial interference.

15. The reinforced telescoping member of claim 14 wherein said tubular wall and said reinforcement band both have a substantially rectangularly cross-section.

16. The reinforced telescoping member of claim 15 wherein said tubular wall is formed from a Kevlar composite material and said reinforcement band is formed from an aluminum material.

17. The reinforced telescoping member of claim 16 further comprising an adhesive layer bonding said reinforcement band to said tubular wall.

18. A method for making a reinforced telescoping member for a multiple member telescoping body of a telescoping stabilization system, the steps comprising:
    providing a rectangular tubular member having a rectangular sidewall having an exterior peripheral surface;
    forming a rectangularly shaped peripheral recess having a predetermined depth through the exterior peripheral surface of the rectangular sidewall adjacent an upper end of the rectangular tubular member;
    forming a rectangular reinforcement band to a shape complemental to a shape of said exterior peripheral recess; and
    positioning the rectangular reinforcement band within the rectangularly shaped peripheral recess for providing reinforcement to the rectangular sidewall while allowing the rectangular reinforcement band having a depth substantially no greater than the predetermined depth of the rectangularly shaped peripheral recess to slideably engage within another rectangular tubular member without substantial interference.

19. The method of claim 18 further comprising a step of using an adhesive to bond the rectangular reinforcement band to the rectangular tubular member prior to the positioning step.

20. The method of claim 19 wherein the rectangular tubular member is formed from a Kevlar composite material and wherein the rectangular reinforcement band is formed from an aluminum material.

* * * * *